(12) United States Patent
Turner et al.

(10) Patent No.: US 7,552,464 B2
(45) Date of Patent: Jun. 23, 2009

(54) TECHNIQUES FOR PRESENTING NETWORK IDENTITIES AT A HUMAN INTERFACE

(75) Inventors: Bryan Turner, Cary, NC (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 861 days.

(21) Appl. No.: 11/045,664

(22) Filed: Jan. 29, 2005

(65) Prior Publication Data

US 2006/0174322 A1    Aug. 3, 2006

(51) Int. Cl.
G06F 7/58        (2006.01)
G06F 15/16       (2006.01)
G06K 19/00       (2006.01)

(52) U.S. Cl. .......................................... 726/3; 713/153
(58) Field of Classification Search ................. 713/153, 713/182, 200, 201, 189; 700/48; 712/27; 706/26; 361/724; 709/246; 726/2, 3
See application file for complete search history.

(56) References Cited

U.S. PATENT DOCUMENTS

| | | | | |
|---|---|---|---|---|
| 5,548,646 | A * | 8/1996 | Aziz et al. ................... | 713/153 |
| 6,000,827 | A * | 12/1999 | Hosogi et al. ................. | 700/48 |
| 6,092,178 | A * | 7/2000 | Jindal et al. .................... | 712/27 |
| 6,366,897 | B1 * | 4/2002 | Means et al. ................... | 706/27 |
| 7,100,195 | B1 * | 8/2006 | Underwood .................... | 726/2 |
| 2003/0030990 | A1 * | 2/2003 | King et al. ................... | 361/724 |
| 2004/0015610 | A1 * | 1/2004 | Treadwell .................... | 709/246 |
| 2004/0221163 | A1 * | 11/2004 | Jorgensen et al. ........... | 713/182 |
| 2005/0039040 | A1 * | 2/2005 | Ransom et al. ............. | 713/200 |
| 2005/0050356 | A1 * | 3/2005 | King et al. ................... | 713/201 |
| 2005/0144152 | A1 * | 6/2005 | Punaganti et al. .............. | 707/1 |
| 2005/0160280 | A1 * | 7/2005 | Caslin et al. ................ | 713/189 |
| 2006/0095955 | A1 * | 5/2006 | Vong ............................. | 726/3 |

OTHER PUBLICATIONS

Sungzoon Cho; Web based Keystroke Dynamics Identity Verification using Neural Network; Year 2000; Journal of Organizational Computing and Electronic Commerce, vol. 10, No. 4, pp. 295-307.*
Bryce Wilcox-O'Hearn, Names: Decentralized, Secure, Human-Meaningful: Choose Two, /distnames.html, Sep. 22, 2003, Publisher: zooko.com, Published in: Internet.

* cited by examiner

Primary Examiner—Kambiz Zand
Assistant Examiner—Monjour Rahim
(74) Attorney, Agent, or Firm—Stolowitz Ford Cowger LLP (57) ABSTRACT

Techniques for presenting identification of a remote network entity to a human user include determining one or more vectors of presentation elements that are readily distinguishable and memorable to a user. Message data is received from a remote process on the network and includes a network identity that uniquely identifies an associated remote entity. The network identity is input to a secure function to produce a secure number. A secure function produces dissimilar output values for similar input values. A particular presentation element is selected from a vector based only on the secure number and presented to the user. Even when the network identity is similar to that of a trusted entity, the particular presentation element is expected to be dissimilar to one associated with the trusted entity.

37 Claims, 5 Drawing Sheets

TECHNIQUES FOR PRESENTING NETWORK IDENTITIES AT A HUMAN INTERFACE

BACKGROUND OF THE INVENTION

1. Field of the Invention

The present invention relates to using network identities at a human interface, and in particular to associating multiple familiar patterns with a network identity to improve human recognition of network identities or discrimination among multiple network identities, or both.

2. Description of the Related Art

Networks of general purpose computer systems connected by external communication links are well known and widely used in commerce. The networks often include one or more network devices that facilitate the passage of information between the computer systems. A network node is a network device or computer system connected by the communication links. An "end node" is a node that is configured to originate or terminate communications over the network. An "intermediate network node" facilitates the passage of data between end nodes.

A human interacts with one or more local processes operating on a local end node that exchange data with one or more remote processes operating on one or more different, remote end nodes elsewhere on the network. In many commercial circumstances, information exchanged between a local process and a remote process is confidential and sensitive. For example, the information sent includes a user's account identification (user ID or credit card number) and password for accessing a bank account through the remote end node. If a malicious party were to obtain the user ID and password, the malicious entity could access the user's account and divert substantial user funds for the benefit of the malicious entity or to the harm to the user, or both.

Various security procedures are in place to provide secure transmission of confidential and sensitive data between the local node and the remote node. For example, in the public key infrastructure (PKI) a public key is distributed to users. PKI is well known and widely used in commercial transactions over the Internet, and described, for example, in the article published by THE OPEN GROUP, as "Architecture for Public-Key Infrastructure," 1997, Publisher: www.opengroup.org/public/tech/security/pki/apki_1-0.pdf, Published in: Reading, UK, the entire contents of which are hereby incorporated by reference as if fully set forth herein.

A network entity, such as a bank, sends its public key to a user during communication between the bank and user, such as when the user connects with the bank's website. The name of the entity and its public key are authenticated by a trusted PKI arbiter. The user's local process employs the public key to encrypt information to be sent over the network. The original information is called plain text. The encrypted information is called ciphertext. The ciphertext can only be decoded using a private key that is known only to the one receiver, e.g., the bank. The private key can not practically be deduced from the public key, the plain text and the ciphertext. In many procedures, PKI is used to securely exchange an unpredictable temporary session key; and the session key is used to encrypt and decrypt subsequent messages between the local node and the remote node for the duration of a session.

Many security procedures depend on a user distinguishing a trusted entity from an untrusted entity. Such procedures are subject to attacks by a malicious entity who can exploit human deficiencies to dupe a user into believing the malicious entity is a trusted entity.

One approach for duping a user is for the malicious entity to use a network identity that appears to the user to be the network identity of a trusted partner, such as the bank. For example, the malicious entity initiates communications with a user and identifies itself with a name similar to the name of a trusted partner and provides the malicious entity's own public key, as verified by the arbiter. In some cases, the malicious entity's public key can look similar to the trusted partner's public key, as well. In other cases, the public keys are so long and meaningless to a human observer that a user does not view them and does not notice even a substantial difference in the public keys. Based on the similar name, the user engages in secure communications with the malicious entity. Because the communications are apparently secure, the user is likely to divulge sensitive and confidential information, such as bank accounts and passwords.

A network entity can be identified in a variety of ways. One way a network entity is identified is by the entity name and public key available through PKI, as described above. A malicious entity can appear to be a trusted partner by using a similar but different name. For example, the malicious entity can register with the arbiter as "SMITH BANK" in order to confuse users who trust "Smith Bank" if the registry is case sensitive. Any other changes to a target name can be made to confuse a user into believing communications are with the target, provided the arbiter recognizes the difference. In some cases the number of spaces is significant to the arbiter, so that "Smith Bank" with two intervening spaces is different than "Smith Bank" with one intervening space. Similarly, a numeral "1" a vertical bar "|" and the letter "l" can be substituted for each other, or the numeral "0" and the letter "O" can be exchanged. Other synonyms or homonyms can be substituted for each other, such as "Inc." for "Corp." or "Corporation" or "Incorporated", and "2" for "two" or "too" or "to", and "4" for "for" or "four", and "five" for "5", and so on.

Another way a network entity is identified is by the network address of the user's end node. For example, an Internet Protocol (IP) address for local node is a 32 binary digit (bit) number. To make it easier for humans to find a particular end node without having to memorize 32 bit addresses, the world wide web of network resources allows a resource on a node, such as a file or process, the node itself, or a group of nodes on the same sub-network to be identified by a name called a Universal Resource Locator (URL). A domain name server (DNS) is a process that executes on a network node to resolve URL names into IP addresses. A malicious entity can register with the DNS using a name that a user perceives to be the same as the name of a trusted partner. Some of the substitutions described above for the PKI registry can be employed here. Furthermore, the exact name of the trusted partner can be used in a URL subdomain that would confuse even a careful user who is unaware of URL conventions. According to URL convention, the domain name appears to the left of ".com" and a subdomain appears to the left of its parent domain separated by a period. Thus, even if a careful user knows that the website domain name for ABC Corp. is "ABCcorp.com" a malicious entity which owns domain name "WelcomeTo.com" can confuse the user when a link is encountered to the malicious entity subdomain "ABCcorp.com.WelcomeTo.com".

Another way a network entity is identified is by an email address. An email address includes a personal name and a URL domain name separated by the symbol "@". A user may reply to an email from an apparently trusted email sender. For example, if a well known Internet Service Provider has the domain "isp.net", and the user has an account at Smith Bank, which has a domain "SmithBank.com", the user might reply with confidential information to an email from an email address such as "member.services.SmithBank@isp.net."

In some networks, a user is identified by other identifications, such as a telephone number on a telephone network and an employee identification code on an enterprise private network.

Many of the identifications for entities on a network involve a large number of almost random characters and digits that most people have trouble remembering or distinguishing. Identifications that include names that are easier to remember might still be found confusing if two names appear to be synonymous, such as in examples given above. Thus a user might easily be duped into believing network communications are being conducted with a trusted entity when in fact the communications are being conducted with a different entity. The user is then subject to unintentionally revealing sensitive and confidential information.

Based on the foregoing description, there is a clear need for techniques that present identifications for network entities that clearly distinguish to a human observer different network identifications, no matter how similar the different network identifications are perceived by the human observer to be. Furthermore, there is a clear need for substantially distinguishing different network identifications even in the presence of efforts by a malicious entity to appear similar.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for presenting network identities at a human interface. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Network identities can sometimes mislead human users. Techniques are provided to improve human recognition of differences among confusing and apparently similar network identities by mapping the network identities to user-selectable sets of recognizable and distinguishable presentation elements, such as images, text, and sounds.

1.0 Overview of Network Identities

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

Figure 1:
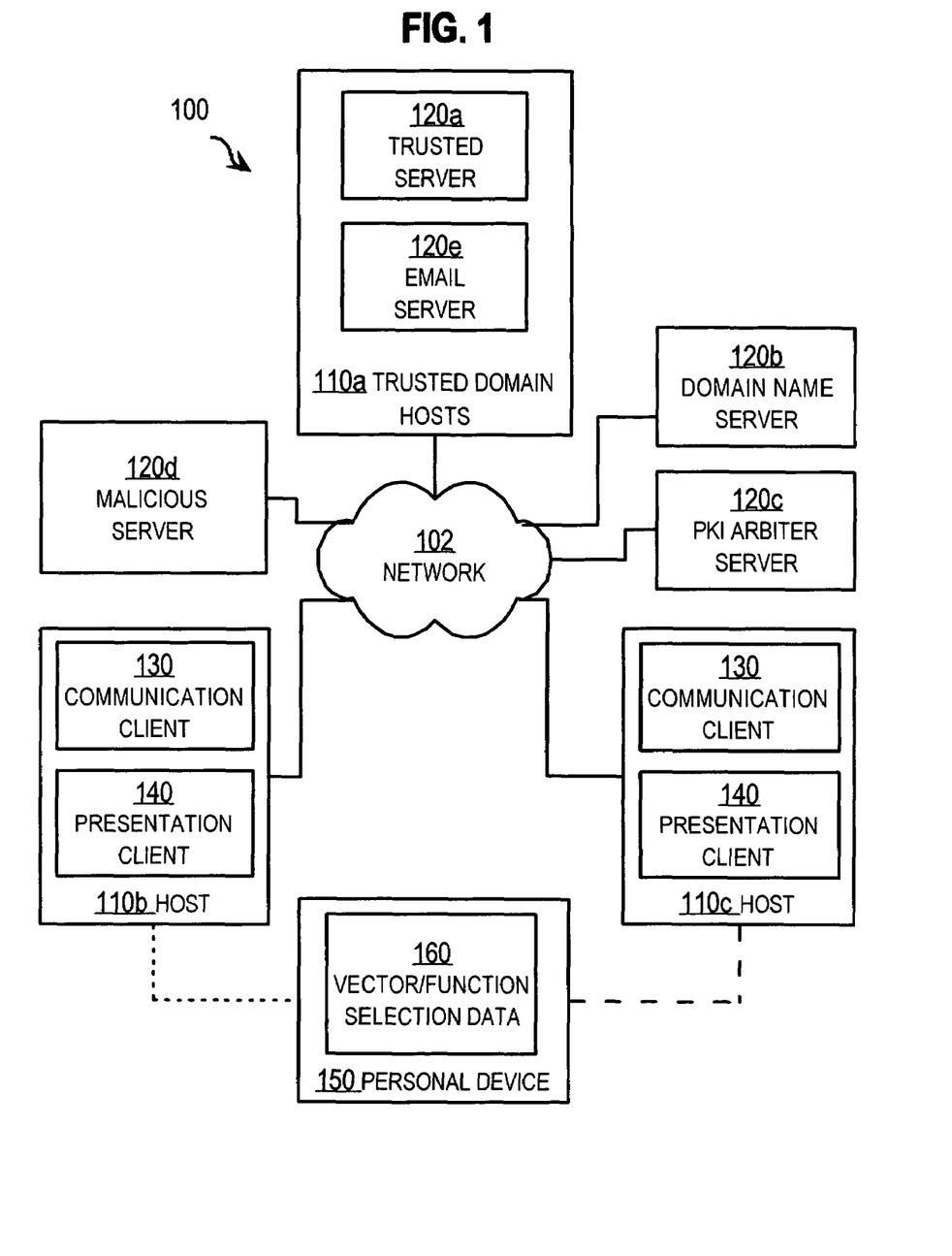
FIG. 1 is a block diagram that illustrates a system 100 that presents network identities, according to an embodiment.

FIG. 1 is a block diagram that illustrates a system 100 that presents network identities, according to an embodiment. The system 100 includes a network 102, hosts 110a, 110b, 110c (collectively referenced hereinafter as hosts 110), various server processes called servers 120a, 120b, 120c, 120d, 120e (collectively referenced hereinafter as servers 120), and a communication client 130. In an illustrated embodiment, the system 100 includes a personal device 150 under the physical control of an individual human, such as a removable magnetic or optical disk or a flash card. The personal device 150 includes data 160 and can be connected to a host, such as host 110b or host 110c, to communicate data with that host. Personal device 150 and data 160 are described in more detail in a later section.

The network 102 is any network that connects a variety of users of host computers, including, but not limited to, local area networks (LANs), wireless networks, wide-area networks (WAN), the Internet (a network of heterogeneous networks using the Internet Protocol, IP), and virtual private networks. The hosts 110 are computers which are connected to network 102. For the purposes of illustration, hosts 110a, 110b, 110c are shown in FIG. 1. In other embodiments more or fewer hosts are connected to network 102. In an example embodiment, network 102 is the Internet which uses the Internet Protocol (IP) to pass data packets among hosts 110 connected to the network 102.

Hosts 110b, 110c execute a communication client 130 to communicate with one or more servers 120 over the network 102. For example, in some embodiments, the communication client 130 is a World Wide Web browser (called a "web browser" herein) that communicates with servers using HyperText Markup Language (HTML) statements in a payload of an IP data packet. A web browser can communicate with any server using HTML in IP data packets, and web browsers are widely used today on many networks. Hosts 110*b*, 110*c* also execute a presentation client 140 that is described in more detail in a later section.

The system includes a trusted server 120*a* that executes on one or more trusted domain hosts 110*a*. The trusted server may be any server that provides a service valued by a user. For example, trusted server 120*a* acts as a banking web site with which bank members using a web browser (e.g., client 130 on host 110*b*) can communicate to log in, access their accounts, pay bills, transfer funds and perform other banking functions. In an illustrated embodiment, the trusted server is identified by its web site domain name, e.g., SmithBank.com for the web site of the Smith Bank Company of city C and state S. Different HTML web pages exchanged with a web browser are generated dynamically by server 120*a* or are located in different hosts among hosts 110*a* or files within those hosts 110*a*. The different locations for these HTML web pages are identified by sub-domain names or directories or both, according to a Universal Resource Locator (URL) convention, as is well known among network practitioners.

The actual IP address used by routers in network 102 to direct a data packet from host 110*b* to server 120*a* is different from the URL name. Thus the URL name is resolved into an IP address by a Domain Name Server (DNS) 120*b*, as is well known in the art. The DNS 120*b* resides on several hosts, not shown, and its data is replicated at several locations around the world. It is assumed for purposes of illustration that the IP address that corresponds to domain name SmithBank.com is 121.234.10.0.

The system includes an electronic mail ("email") server 120*e* that executes on the one or more trusted domain hosts 110*a*. The email server provides email services, such as directing incoming emails to a particular account belonging to an employee or department of the trusted entity (e.g., Smith Bank Company of C, S). People both inside and outside the bank can use the email services of sever 120*e* using an email client. Thus in some embodiments the communication client 130 is, or includes, an email client. In an illustrated embodiment, an employee or department of the trusted entity is identified by its email address, e.g., memberservices@SmithBank.com for the email server of the Smith Bank Company of C, S.

Because some communications between a user and the trusted server 120*a* involve sensitive and confidential information, the trusted server 120*a* encrypts some communications with the communication client 130. Many web browsers are configured to perform encrypted communications with a server using the PKI system. For example, the Smith Bank Company registers with a PKI arbiter as Smith Bank Co. and obtains a public and private key. Smith Bank keeps the private key secret and does not share it with any other entity on the network 102. The public key is made freely available to anyone connected to network 102. When the user of communication client 130 wishes to communicate with the trusted server 120*a*, the trusted server 120*a* sends a message to the communication client 130 that the server is registered with the PKI arbiter as Smith Bank Co. and indicates its public key. The name and key are verified by the PKI arbiter. This can be done in different ways. In one approach the message from the trusted server includes a digital signature of the PKI arbiter which the communication client can verify by testing with the PKI arbiter's public key, also known to the communication client 130. Both the PKI arbiter's public key and a digital signature verifying another entity's public key are available from the PKI arbiter server 120*c* connected to the network. The PKI arbiter server 120*c* executes on one or more hosts (not shown).

For purposes of illustration, it is assumed that the public key is represented by the hexadecimal number 0xF80A46CC2700F1. A hexadecimal number is indicated by the leading 0x and uses the letters A through F to represent the values 10 through 15; so each hexadecimal digit represents 4 binary digits (bits). An actual public key would be longer than the example public key but the example number is sufficient to demonstrate the workings of example embodiments of the invention.

Thus, in the example embodiment, the trusted entity Smith Bank has several network identities besides its physical identity as the Smith Bank Company of C, S. The network identities include: 1] a world wide web domain name SmithBank.com and its corresponding IP address 121.234.10.0; 2] several email addresses, including memberservices@SmithBank.com; and 3] a PKI name Smith Bank Co. and public key 0xF80A46CC2700F1.

System 100 also includes a malicious server 120*d* used by a malicious entity to communicate over the network 102. For purposes of illustration it is assumed that the malicious entity is called I.D. Thief. It is further assumed that I.D. Thief has registered a domain name go.com on the DNS 120*b* for which an IP address 122.243.100.0 is assigned that is, fortunately for I.D. Thief, confusingly similar to the IP address of Smith-Bank.com. It is further assumed that I.D. Thief has set up a web site at a sub-domain named SmithBank at its domain go.com. It is further assumed that I.D. Thief has registered with the PKI arbiter as Smith Bank C0. and received a public key 0xE230ABD417AF11. It is further assumed that I.D. Thief has an email address memberservices@SmithBank.go.com Table 1 summarizes the network identities of the example trusted entity Smith Bank Company and the confusingly similar network identities of the example malicious entity I.D. Thief.

TABLE 1

Network identities of two example entities on a network.

| entity | Smith Bank Company | I.D. Thief |
|---|---|---|
| web site name | SmithBank.com | SmithBank.go.com |
| IP address | 121.234.10.0 | 122.243.100.0 |
| email | memberservices@SmithBank.com | memberservices@SmithBank.go.com |
| PKI register | Smith Bank Co. | Smith Bank C0. |
| public key | 0xF80A46CC2700F1 | 0xE230ABD417AF11 |

It is apparent from Table 1, that there are multiple scenarios in which a common user of network 102 can be duped by I.D. Thief into believing the user is communicating with Smith Bank. It is noted in particular that common users of a network rarely make an attempt to see or remember the numeric portions of the network identities such as the IP address and the public key. Thus the relatively disparate public keys of the two entities do not provide sufficiently useful information for the common user to recognize that communications are with I.D. Thief instead of Smith Bank. The common user is apt to send the user's account number and password to I.D. Thief as the normal course of communicating with Smith Bank.

Two scenarios are described here for the purpose of illuminating advantages of the illustrated embodiments. For purposes of illustration it is assumed that the human user of host 110b is user U. In a first scenario, I.D. Thief attempts to install malicious software onto the host 110b of user U. For example, I.D. Thief attempts to install spying software (often called "spyware") to capture U's keystrokes when U next contacts the Smith Bank web site. The spyware sends those keystrokes to I.D. Thief who can then deduce U's account number and password.

Web browser technology has progressed to allow software to be installed from a remote system, such as servers 120, through a browser link. This is recognized as a security risk to the browser's host computer, so the procedure for installing such software requires that the browser prompt the user for a response. The remote server provides to the browser the software to be installed and a network identity for the network entity responsible for the remote server. The network identity often takes the form of the entity's PKI register name, its public key and verification of the public key from the PKI arbiter. The register name and public key combination is certified by a digital signature (also called a certificate) that can be verified by the web browser with the public key from the PKI arbiter server 120c.

The prompt takes the form of a query dialog that warns the user U that software is going to be installed, that such an installation is dangerous and should not be allowed unless the user U trusts the remote network entity attempting to make the installation. The dialog identifies the remote network entity by the PKI register name and sometimes by the public key of the remote network entity.

In the first scenario, the network identity is the combination of the PKI register name and the public key of I.D. Thief who is trying to install spyware on the host 110b of user U. The dialog warns user U that software is going to be installed by Smith Bank C0. with public key 0xE230ABD417AF11. U's browser verifies that the public key is the correct key for Smith Bank C0. This appears to U as if Smith Bank is providing software for U's host 110b to support special services from Smith Bank's web site. Because U trusts Smith Bank, U is likely to agree to install the software. U has not memorized the Smith Bank public key and so has ignored it. U is not well acquainted with the legitimate PKI register name of Smith Bank and does not notice that the numeral zero has been substituted for the letter o in the register name.

In the second scenario, the user receives an email from I.D. Thief's email address memberservices@SmithBank.go.com. The email alerts user U to a security breech or to a need to update records at the Bank's web site. I.D. Thief's web site URL SmithBank.go.com is included as a hyperlink in the email. The user U activates the hyperlink which starts U's web browser and communications with I.D. Thief's web site server 120d. The SmithBank.go.com web site server 120d prompts user U for information desired by I.D. Thief. For example, the web site displays a login dialog that appears similar to the legitimate login dialog at the legitimate web site that prompts user U for U's account number and password.

This appears to U as if Smith Bank is contacting U and bringing U to the Smith Bank web site. Because U trusts Smith Bank, U is likely to agree to respond and to login. U did not notice the subtle change in the email address. U does not know the URL syntax sufficiently to realize that the web site is not in the SmithBank.com domain. Even if the IP address were presented, user U would not likely remember the correct IP address and thus would not recognize the discrepancy.

Thus, in spite of sophisticated security procedures in place, human recognition and training deficiencies in practice undermine the procedures and reduce the security that is actually achieved.

According to various embodiments of the invention, presentation elements that are easily remembered and distinguished by a human user are presented with network identities to accentuate differences between identities that are otherwise similar.

In an illustrated embodiment shown in FIG. 1, a presentation client 140 is installed on hosts 110b, 110c used by a human user who communicates with potentially malicious network entities over network 102. In some embodiments, presentation client 140 is incorporated within communication client 130, e.g., as a plug-in module for a web browser. In some embodiments, the presentation client 140 is separate. The steps performed by presentation client 140 to help a user distinguish among network entities are described next with reference to FIG. 2.

2.0 Method of Presenting Network Identities

Figure 2:
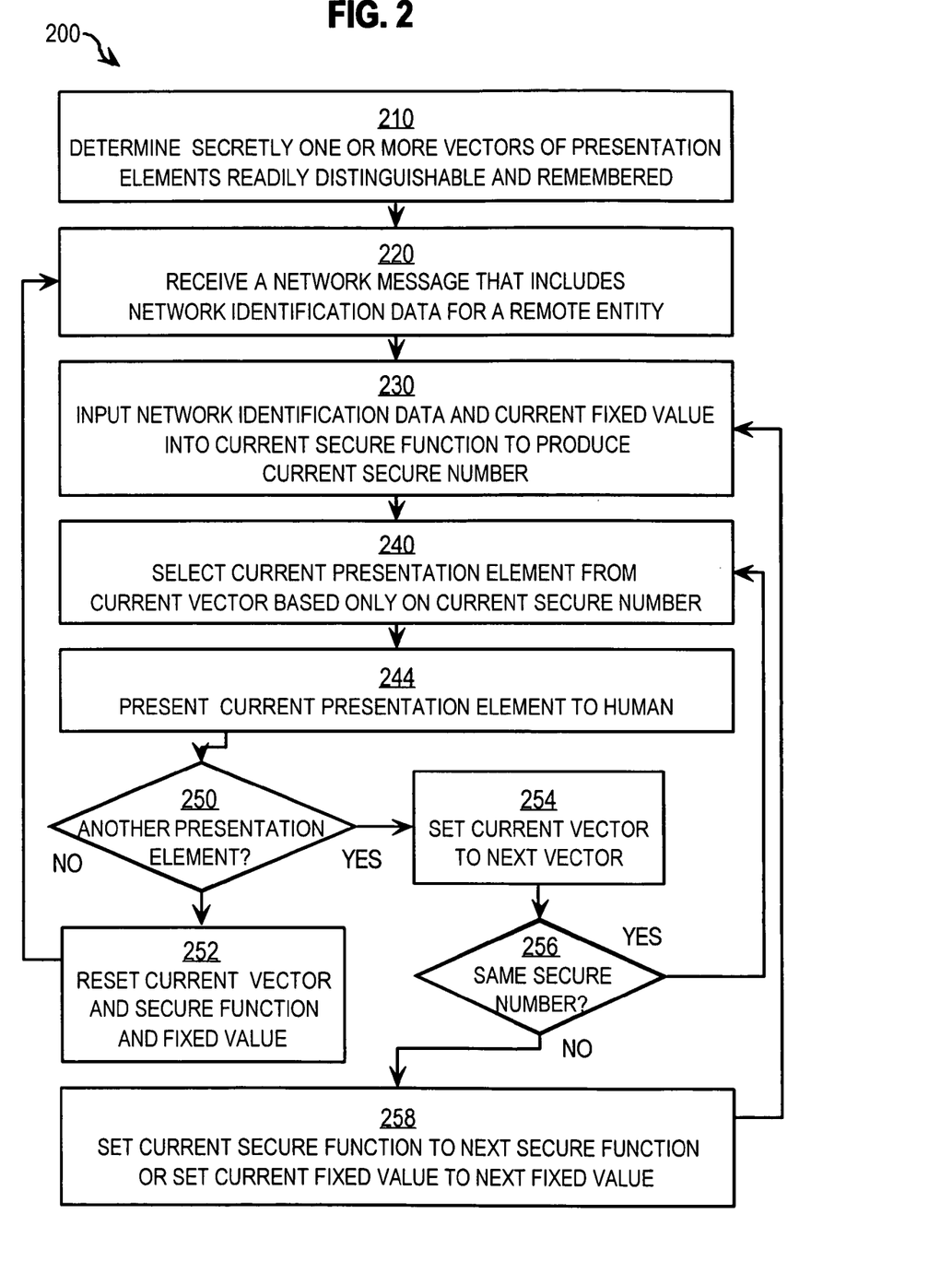
FIG. 2 is a flow diagram that illustrates at a high level a method for presenting network identities at a human interface according to an embodiment.

FIG. 2 is a flow diagram that illustrates at a high level a method 200 for presenting network identities at a human interface according to an embodiment. Although steps are shown in FIG. 2 in a particular order for purposes of illustration, in other embodiments one or more steps are performed in a different order or overlapping in time or are omitted or are changed in some combination of ways.

In step 210, one or more vectors of presentation elements are determined. Each vector includes a particular sequence of presentation elements that are easily recognized, remembered and distinguished from each other. It is realized that what is easily recognized, remembered and distinguished is a subjective matter that varies among individuals. Several embodiments to determine the vectors are therefore described here. Most people perceive and process images and short strings of text better than long strings of numbers or random characters. Thus many of the embodiments use familiar images or words as presentation elements. Some people perceive audio elements better than or as well as visual elements like images and short text. Thus in some embodiments, audio elements are used, at least in some vectors.

In some embodiments, the user is prompted to provide presentation elements that the user finds particularly memorable and distinctive. For example, the user U may enter names of U's friends, or postcards or pictures U has taken of different flowers or landscapes that U recognizes.

The number of elements in each vector is a matter of experiment and design. In some embodiments, described in more detail below, it is preferable to use a different number of elements in each vector. In some embodiments, the number of elements is related to the number of different identities to be distinguished and the number of vectors to be used. In an illustrated embodiment, the number of elements is different for each vector and is a prime number on the order of 50, such as 47 and 53. Thus one vector might name the 48 contiguous states of the United States less one; and another vector might include images of the 52 playing cards in a poker deck plus a joker. In some embodiments, the number of elements is a power of two.

In some embodiments, one vector is generated by using a different number or sequence for the same presentation elements used in a different vector. For example, in some embodiments, poker cards are used in each of five vectors but in a different order in each one. In an example of other embodiments, a different prime number of poker cards are used in each of five different vectors.

In some embodiments, a large number of vectors are preformed and provided to the user and the user selects one or more of the preformed vectors. In some embodiments, the preformed vectors are public knowledge and distributed with the presentation client 140. For example, during step 210, the user selects from a set of preformed vectors that includes, among others, a vector of United States state outlines, a vector of country outlines, a vector of images of poker cards, a vector of images of magic or fantasy cards, a vector of cartoon characters, a vector of plant images, a vector of animal images, a vector of city names, a vector of other place names, a vector of vegetable names, a vector of popular performer names, a vector of sound files that play a few seconds of sounds, such as popular tunes, animal sounds, nature sounds. After the vectors to be used by a particular user are initially selected during step 210, the same selected vectors are used for that user during the remaining steps in the method 200.

In some embodiments, a dynamic vector with changing presentation elements is used. For example, in some embodiments, the user selects a vector with a large number of presentation elements (such as one billion elements) that are all the same and that indicate an unknown and potentially dangerous identity. For example, in one embodiment a skull and crossbones image is used for each of the one billion presentation elements. As the user approves a network identity that is mapped to a particular position in the vector (as described in more detail below), the presentation element at that position is replaced by a different one that indicates a known and approved identity. For example, in one embodiment an image of a company logo for the user's company is used as the replacement presentation element. The dynamic vector may be represented in any way known in the art. In these example embodiments, the dynamic vector contains only two values, e.g., one indicating the skull and crossbones, the other indicating the company logo, and can be represented as a string of binary digits where a value zero indicates the un-approved identity and the value one indicates the approved identity.

To ward off directed attacks that attempt to exploit similarities in the presentation elements, in the illustrated embodiment, the one or more vectors determined during step 210 are kept as local secrets and are not exposed as plain text to processes on the network. In some embodiments, the user memorizes the selection. In some embodiments, the vector selections are stored in a secure area of the host 110b that is not exposed to the network. In some embodiments, the vector selections are stored at a trusted server and downloaded to the user's host in a secure manner upon request. A secure manner includes encrypted data sent over a public network and unencrypted data sent over a private network or some combination. In an illustrated embodiment, the vector selections are stored on a separate device over which the user has physical control (e.g., stored vector/function selection data 160 on personal device 150). Any device may be used as device 150. For example, in various embodiments the personal device 150 is a floppy disk, an optical disk, a flash card, and a key FOB, among others.

In some embodiments with data 160 stored on personal device 150, user U switches from host 110b to host 110c, and step 210 includes reading from the data 160 stored on personal device 150 at host 110c.

Any number of vectors may be determined during step 210. In an illustrated embodiment, three vectors are determined.

Figure 3A:
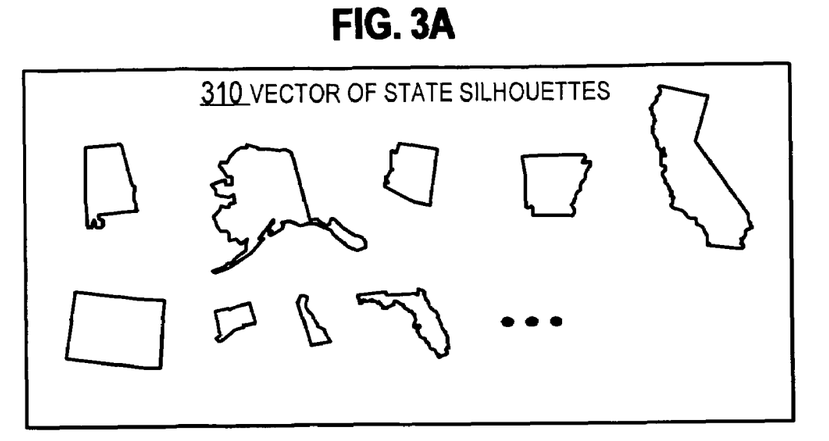
FIG. 3A is a block diagram that illustrates a vector of presentation images, according to an embodiment.

FIG. 3A is a block diagram that illustrates a vector 310 of presentation images, according to an embodiment. Vector 310 includes images of United States state outlines. Nine state outlines are shown and others are indicated by the ellipsis. It is assumed for purposes of illustration that the vector 310 includes 53 outlines, the 50 states, Puerto Rico, Guam, and Samoa and are in alphabetical order.

Figure 3B:
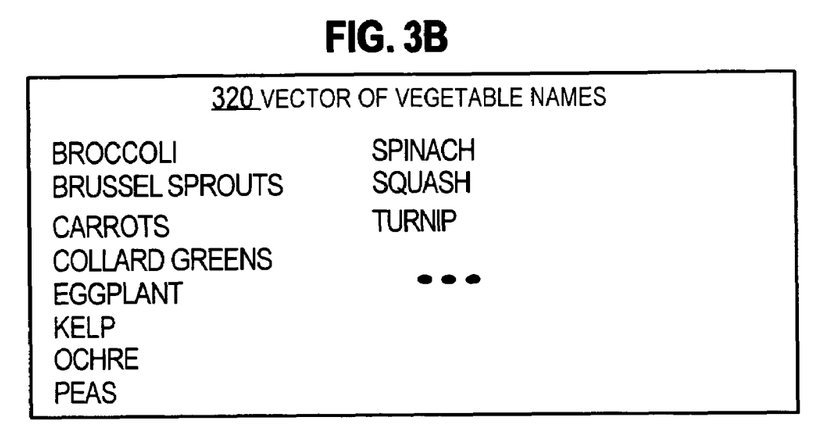
FIG. 3B is a block diagram that illustrates a vector of presentation text strings, according to an embodiment.

FIG. 3B is a block diagram that illustrates a vector 320 of presentation text strings, according to an embodiment. Vector 320 includes names of vegetables. Eleven vegetable names are shown and others are indicated by the ellipsis. It is assumed for purposes of illustration that the vector 320 includes 47 vegetable names in alphabetical order.

Figure 3C:
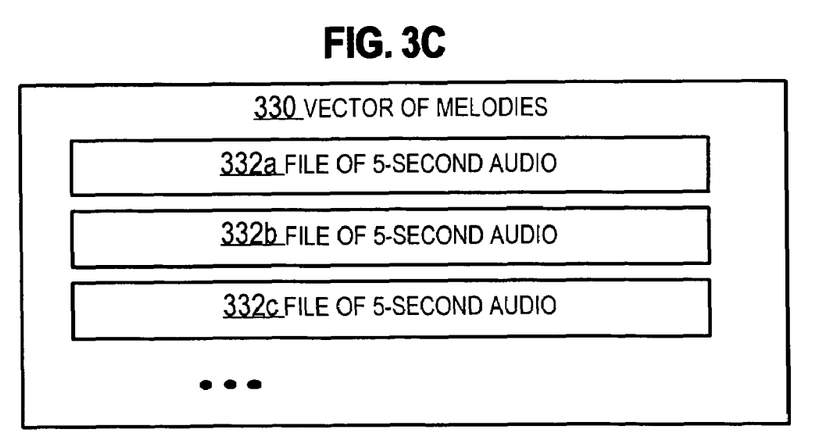
FIG. 3C is a block diagram that illustrates an vector of presentation audio files, according to an embodiment.

FIG. 3B is a block diagram that illustrates a vector 330 of audio presentation files, according to an embodiment. Vector 320 includes five-second audio files. Three five-second audio files 332a, 332b, 332c are shown and others are indicated by the ellipsis. It is assumed for purposes of illustration that the vector 330 includes 41 five-second audio files in alphanumeric order by file name.

It is further assumed for purposes of illustration that, during one embodiment of step 210, user U on host 110b has selected vectors 310, 320, 330 from a large set of preformed vectors available on presentation client 140. The user U decides to store this selection in vector/function selection data 160 on personal device 150. In subsequent embodiments of step 210, the vectors are determined by reading from the data 160 that indicates the vectors selected on device 150.

In step 220, a network message is received that includes network identification data that indicate a unique network identity for a remote network entity. For example, an email is received from Smith Bank that includes memberservices@SmithBank.com in a "From" field.

In step 230, the network identification data and a current fixed value are input into a current secure function. A secure function is one that produces dissimilar output values when similar input values are input to the function. Such secure functions are well known in the art of cryptography and some are quite fast and efficient. An example of a secure function is dividing the input bit string into equal sized portions and combining them with exclusive OR (XOR) operations. Another example is a hash function. A hash function takes a variable length input string and produces a fixed length output, such as the successive XOR operations just described. Similar inputs give different outputs. One-way hash functions may also be used, but these are more computational intensive. A one-way hash function readily produces the fixed length output from the input, but it is difficult to generate an input that produces the same output. Some one-way hash functions that are widely known and used include SNEFRU, N-HASH, message-digest four (MD-4), and SHA, among others.

In some embodiments, a single secure function is always used and is publicly known and distributed with presentation client 140. In some embodiments, different secure functions are used for different vectors. In some embodiments the different secure functions are distributed with the presentation client 140 and the user selects the function to use. In some of these embodiments, the user's selection of the secure function is also kept secret and stored in the data 160 on device 150. In some embodiments the choice among multiple secure functions is made during step 210, described above.

The output from the secure function is herein called a secure number. In some embodiments, the same secure number is used with multiple different vectors. In some of these embodiments, each of the vectors has a different number of elements; otherwise there is no additional discrimination provided by the second vector.

In some embodiments, different secure numbers are used with different vectors. In some of these embodiments, two or more of the vectors have the same number of elements. In some of these embodiments, different secure numbers are produced by using different secure functions with the different vectors. In some of these embodiments, the different secure function is simply selecting a particular number of bits from different parts of the identification data. For example, a different slice of the network identification data is taken for each vector. In one of these embodiments, the number of bits in the slice is matched to the number of elements in the vector, and the vectors have numbers of elements that are powers of two. Thus if the vector has 64 elements, a 6 bit slice is taken from the network identification data. The location of the 6 bits can be chosen based on a function of the network identification data itself, such as the number of the characters in the string divided by the number of vectors, multiplied by 1 for the first vector, 2 for the second vector, etc.

Different secure numbers can be produced from the same secure function and the same network identification data if a different fixed value is appended to the beginning or end, or interleaved with the network identification data before the combination is input to the secure function.

In the illustrated embodiments, it is desired that the same network identification data produce the same secure number for a particular vector. Thus any value combined with the network identification should be the same when the network identification is the same. In some embodiments the combining value is a constant for all network identification data.

To assure the combining value is the same for the same network identification but different for a different network identification, the combining value is based on some property associated with the network identification. For example, if the network identification is a PKI name, then the combining value is the public key in some embodiments. If the network identification data is the PKI name and the public key, then the combining value is the date of registry of the name and key at the PKI arbiter server, in some embodiments. So the combining value is fixed with respect to the network identification data value. In some embodiments no combining value is used.

In an illustrated embodiment, the same secure function is used for all vectors, no combining value is used, and the selected vectors have different numbers of elements. Therefore the current secure function is the only secure function and the current fixed value is null, so no bits are combined with the network identification data. It is assumed for purposes of illustration that, during step 230, the bit string representing the network identification data memberservices@SmithBank.com is input into the only secure function to produce a secure number that has a value 539.

In step 240, the current presentation element is selected from the current vector based on the value of the current secure number and no other variable. Any method may be used to make this selection based on the secure number. In an illustrated embodiment, step 240 is performed by selecting the $539^{th}$ element of the current vector. In the illustrated embodiment, the current vector is the first vector 310 of the state outlines. Since the vector has only 53 elements, the counting is restarted at the beginning after the last element is reached. The result is expressed by the modulo function mod (539,53) and is equal to 9. It is assumed for purposes of illustration that the $9^{th}$ presentation element is the outline of the state Florida.

In step 244, the presentation element is presented to the human user along with at least a portion of the network identification data. In the illustrated embodiment, the outline of Florida is presented along with a display of the email source address memberservices@SmithBank.com.

Figure 4A:
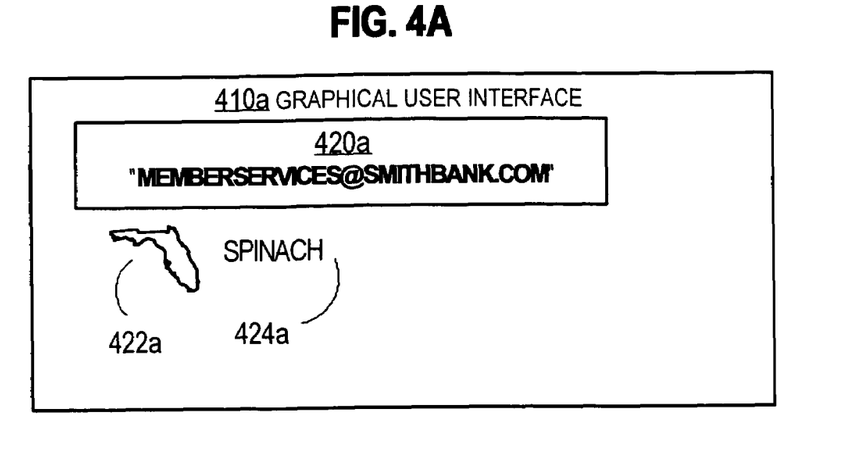
FIG. 4A is a block diagram that illustrates a human interface with multiple presentation elements associated with a trusted entity, according to an embodiment.

An example display showing this presentation element with the network identification data is depicted in FIG. 4A. FIG. 4A is a block diagram that illustrates a graphical user interface 410a with multiple presentation elements associated with a trusted entity, according to an embodiment. The graphical user interface may be a web browser displaying an HTML document into which the presentation client 140 has inserted the presentation elements. The interface 410a includes a field 420a that contains the network identification data memberservices@SmithBank.com. The interface 410a also includes the selected presentation element 422a from the first vector, the outline of the state Florida. The interface 410a also includes the selected presentation element 424a from the second vector, the vegetable name Spinach. At the time step 244 is first executed in the illustrated embodiment only field 420a and presentation element 422a are displayed. Presentation element 424a is displayed during the next execution of step 244 a few processor cycles later.

In step 250, it is determined whether another presentation element is to be presented. If not, then control passes to step 252. In step 252 the current vector and secure function and fixed combining value are reset to their initial values, e.g., the first vector, the first secure function, and the first fixed value.

If it is determined during step 250 that another presentation element is to be presented, then control passes to step 254. In the illustrated embodiment, there are two more presentation elements to present, so control passes to step 254.

In step 254 the current vector is set to the next vector. For example, in the illustrated embodiment, the current vector is set to the second vector 320 of vegetable names. Control then passes to step 256.

In step 256, it is determined whether the same secure number is to be used on the next vector. If so, then control passes back to step 240 to select a current presentation element using the current vector and the same secure number.

If it determined during step 256 that the same secure number is not to be used on the next vector, then control passes to step 258. In step 258, the current secure function is set to the next secure function, if there is one; and the current fixed values is set to the next fixed value, if there is one. Control then passes back to step 230 to input the network identification data combined with the current fixed value into the current secure function to generate a new secure number.

In the illustrated embodiment, it is determined in step 254 that the same secure value, 539, is to be used for the next vector and control passes to step 240. In step 240, the current presentation element is selected from the second vector 320 based on the secure number 539. The number of elements is 47 so the selected presentation element is determined by mod(539, 47)=22. It is assumed for purposes of illustration that the $22^{nd}$ vegetable name is Spinach.

In step 244, the selected presentation element is presented on the graphical user interface which then appears as presentation element 424a shown in FIG. 4A.

Steps 250, 254, 256 are then repeated until no more presentation elements are to be presented. In the illustrated embodiment, these steps are executed one more time, and control passes to step 240 with the current vector set to the third vector 330 of melodies.

In step 240, the current presentation element is selected from the third vector 330 based on the same secure number 539. The number of elements is 41 so the selected presentation element is determined by mod(539, 41)=38. It is assumed for purposes of illustration that the 38th melody is a 5-second audio file of the familiar opening notes of Beethoven's Ninth Symphony.

In step 244 the selected presentation element is presented by playing the audio file to generate the familiar opening notes on speakers of host 110b.

In the illustrated example, control then passes through step 250 to step 252. In step 252, the current vector is reset to the first vector, the current secure function is reset to (remains) the only secure function being used and the current fixed value is reset to (remains) null.

Control then returns to step 220 to receive another message from the network.

When vectors have different prime numbers for the number of elements, a different combination of presentation elements is produced for every secure element up to the product of three numbers of elements. For example, in the illustrated embodiment, the product of the numbers of elements for the three vectors is 53*47*41=102,131. Thus every secure number up to 102,131 provides a unique combination. Even if the secure numbers were allowed to go to above this value, the chance of getting the same combination between similar network identities is small.

3.0 Example Presentation Results

In the illustrated example embodiment, every time the user U receives an email from U's bank, Smith Bank, the visual elements depicted in FIG. 4A are displayed and the speakers play the first notes of Beethoven's Ninth Symphony. Eventually the user U learns this association, at least passively.

Now if I.D. Thief tries to dupe user U, the presentation elements change.

Figure 4B:
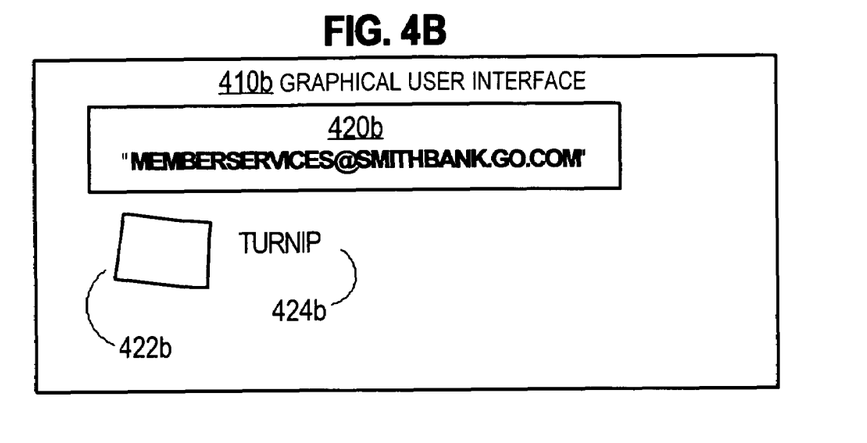
FIG. 4B is a block diagram that illustrates an human interface with multiple presentation elements associated with a malicious entity that attempts to be mistaken for a trusted entity, according to an embodiment.

FIG. 4B is a block diagram that illustrates a human interface 410b with multiple presentation elements associated with a malicious entity that attempts to be mistaken for a trusted entity, according to an embodiment. Even though the email address network identification data displayed in field 420b appears synonymous with the email address of the legitimate Smith Bank, the visual presentation elements 422b, 424b are strikingly different. It is assumed for purposes of illustration that the secure function takes the very similar email address as input during step 230 but generates a substantially different value 112 as the secure number output. It is further assumed that the secure value 112 causes the state outline for Colorado to be displayed as the first presentation element 422b and the vegetable name Turnip to be displayed as the second presentation element 424b. It is further assumed that the secure value 112 causes the first few notes of "Twinkle Twinkle Little Star" to be played over the speakers of host 110b.

The user U, who might otherwise accept the email address displayed in field 420b as legitimately from Smith Bank, is likely alerted by the wrong feel of the Colorado outline and the Turnip vegetable name and the light music. The user more likely detects that this is not the usual Smith Bank that the user U trusts.

Because the malicious entity I.D. Thief is unaware of the vectors U is using, I.D. Thief is practically unable to select a network identification that will appear and sound similar to the sight and sound of the trusted partner. This is so even if the I.D. Thief knows the presentation client 140, the secure function, and the thousands of preformed vectors from which the user has selected. Even if I.D. Thief can tailor the attack for user U, the attack is likely to fail for another user, U2, who has selected a different set of vectors.

In some embodiments, the data stored on personal device 150 (or remote trusted server) includes a list of the network identification data that the user has decided are trustworthy. In these embodiments, the presentation client 140 can detect when a network entity is not on that list and therefore is new to the user. In some of these embodiments, when network identification data appears in a message but not in the list of trustworthy network identifications, the presentation client includes on the display a special dialog. The special dialog indicates the network entity attempting communication is new and may be malicious. The dialog also prompts the user for input to determine whether to add the new network entity identification data to the list for trustworthy entities.

Figure 4C:
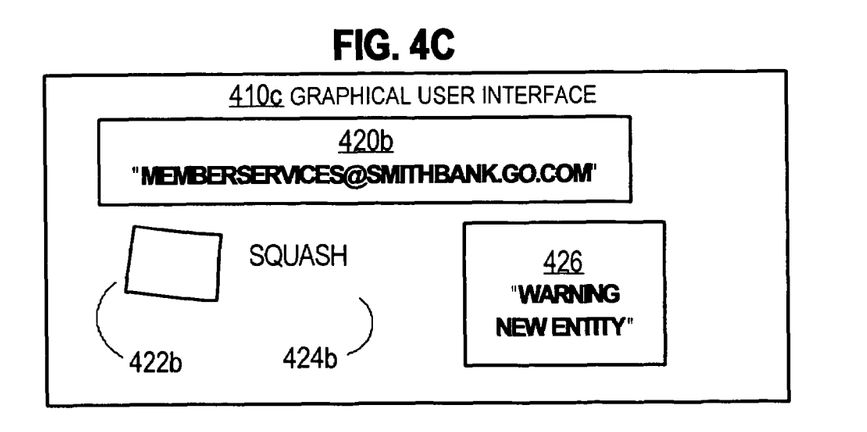
FIG. 4C is a block diagram that illustrates a human interface with multiple presentation elements associated with a malicious entity that attempts to be mistaken for a trusted entity, according to another embodiment.

FIG. 4C is a block diagram that illustrates a human interface 410c with multiple presentation elements associated with a malicious entity that attempts to be mistaken for a trusted entity, according to another embodiment. 410c is like 410b, but includes special dialog field 426. Dialog field 426 presents a warning to the user that the remote network entity attempting communication is new and potentially malicious.

4.0 Implementation Mechanisms—Hardware Overview

Figure 5:
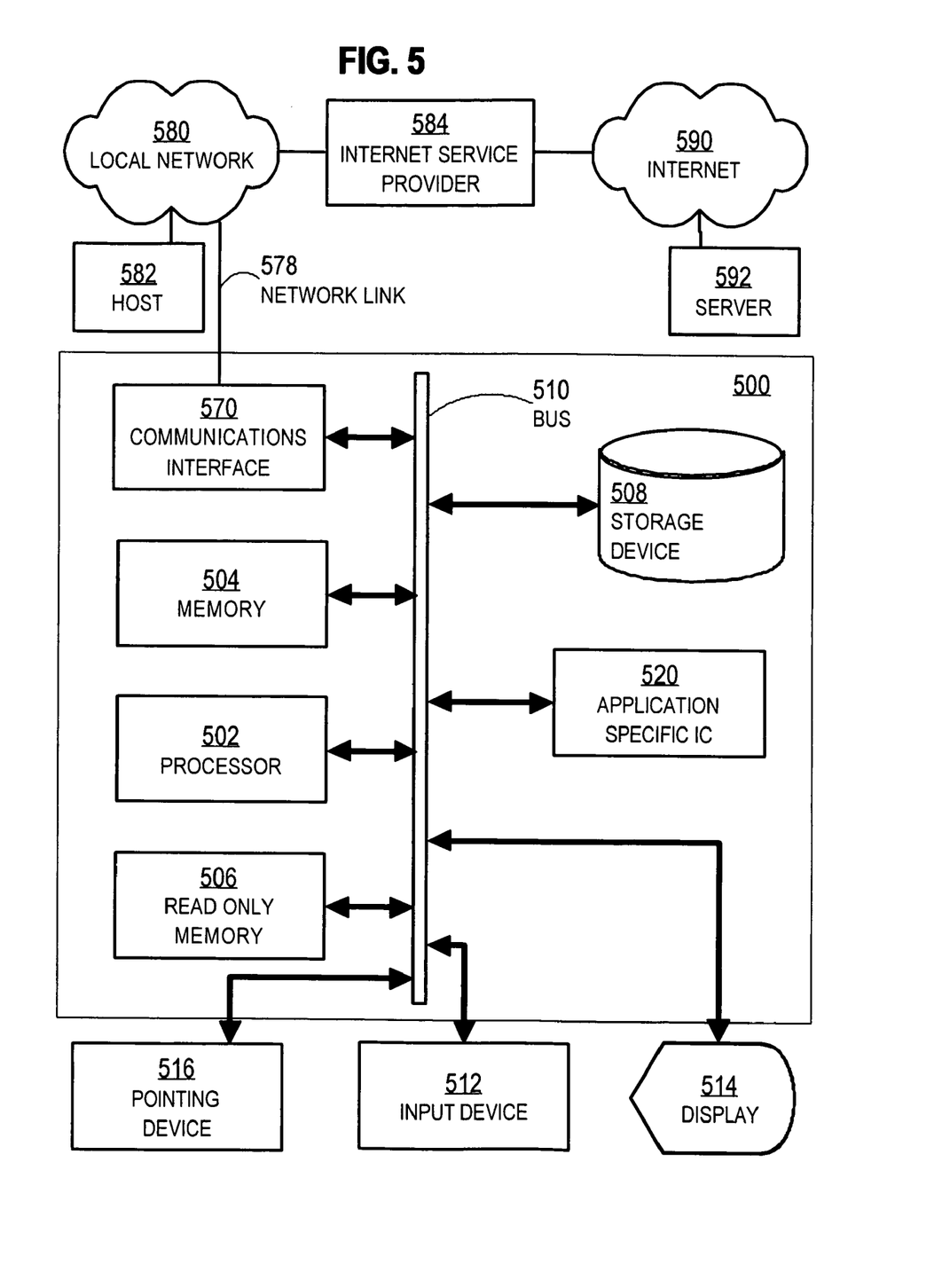
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 502, including instructions for execution. Such a medium may take many forms, including, but not limited to, nonvolatile media, volatile media and transmission media. Nonvolatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, which carry information to and from computer system 500, are exemplary forms of carrier waves. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 502 as it is received, or may be stored in storage device 508 or other nonvolatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for presenting, to a human user, identification for a remote entity on a computer network, comprising:
    determining a first vector that contains a sequence of a first plurality of presentation elements that are readily distinguishable by a particular human user and readily remembered by the particular human user, wherein the first vector contains a first number of presentation elements;
    receiving, from a remote process on the computer network, message data that includes network identification data that uniquely identifies a remote entity associated with the remote process;
    after determining the first vector, inputting the network identification data to a first secure function to produce a first secure number, wherein the first secure function produces dissimilar output values for similar input values;
    selecting a first particular presentation element from the first vector based only on the first secure number; and
    presenting to the particular human user the first particular presentation element, whereby when a portion of the network identification data is similar to a portion of a trusted network identification data for a trusted remote entity, the first particular presentation element is expected to be dissimilar compared to a trusted presentation element selected from the first vector based on a trusted secure number generated by inputting the trusted network identification data into the first secure function.

2. The method as recited in claim 1, further comprising:
    determining a second vector that contains a sequence of a second plurality of presentation elements that are readily distinguishable by the particular human user and readily remembered by the particular human user, wherein the second vector contains a second number of presentation elements;
    selecting a second particular presentation element from the second vector based on a second secure number; and
    presenting to the particular human user the second particular presentation element.

3. The method as recited in claim 2, wherein the second secure number is the same as the first secure number.

4. The method as recited in claim 2, further comprising after determining the second vector, inputting the network identification data and fixed data associated with the network identification data to the first secure function to produce the second secure number that is different than the first secure number.

5. The method as recited in claim 2, further comprising after determining the second vector, inputting the network identification data to a second secure function to produce the second secure number that is different than the first secure number.

6. The method as recited in claim 2, wherein the second vector is the same as the first vector.

7. The method as recited in claim 2, said step of determining the second vector further comprising determining the second vector that is different than the first vector by performing at least one of the following steps:
    forming the sequence of the second plurality of presentation elements by establishing a different sequence of the first plurality of presentation elements;
    selecting the second number of elements from the first plurality of presentation elements, wherein the second number is different than the first number; and
    including in the second plurality of presentation elements a presentation element that is not in the first plurality of presentation elements.

8. The method as recited in claim 2, further comprising:
    determining a third vector that contains a sequence of a third plurality of presentation elements that are readily distinguishable by the particular human user and readily remembered by the particular human user, wherein the third vector contains a third number of presentation elements;
    selecting a third particular presentation element from the third vector based on a third secure number; and
    presenting to the particular human user the third particular presentation element.

9. The method as recited in claim 1, said step of generating the first secure number further comprising inputting the network identification data into a hash function.

10. The method as recited in claim 1, said step of generating the first secure number further comprising inputting the network identification data and fixed data associated with the network identification data into a hash function.

11. The method as recited in claim 1, said step of determining the first vector further comprising:
    receiving data that defines a plurality of different vectors that include the first vector; and
    receiving data that indicates a selection of the first vector without making the selection known over the network.

12. The method as recited in claim 11, said step of receiving data that indicates the selection of the first vector further comprising receiving the data manually input by the particular human user.

13. The method as recited in claim 11, said step of receiving data that indicates the selection of the first vector further comprising receiving the data stored on a device controlled only by the particular human user.

14. The method as recited in claim 1, further comprising:
    determining whether the network identification data is included on a trustworthy list of one or more network identification data values; and
    if it is determined that the network identification data is not included on the trustworthy list, then presenting to the particular human user warning data that indicates that the message data is from a remote entity that is not trusted.

15. The method as recited in claim 11, said step of receiving data that indicates the selection of the first vector further comprising receiving the data securely from a trusted server on the network.

16. A computer-readable medium carrying one or more sequences of instructions for presenting, to a human user, identification for a remote entity on a computer network, wherein execution of the one or more sequences of instructions by one or more processors causes the one or more processors to perform the steps of:

determining a first vector that contains a sequence of a first plurality of presentation elements that are readily distinguishable by a particular human user and readily remembered by the particular human user, wherein the first vector contains a first number of presentation elements;

receiving, from a remote process on the computer network, message data that includes network identification data that uniquely identifies a remote entity associated with the remote process;

after determining the first vector, inputting the network identification data to a first secure function to produce a first secure number, wherein the first secure function produces dissimilar output values for similar input values;

selecting a first particular presentation element from the first vector based only on the first secure number; and presenting to the particular human user the first particular presentation element, whereby when a portion of the network identification data is similar to a portion of a trusted network identification data for a trusted remote entity, the first particular presentation element is expected to be dissimilar compared to a trusted presentation element selected from the first vector based on a trusted secure number generated by inputting the trusted network identification data into the first secure function.

17. The computer-readable medium as recited in claim 16, wherein the execution of the one or more sequences of instructions further causes the one or more processors to perform the steps of:

determining a second vector that contains a sequence of a second plurality of presentation elements that are readily distinguishable by the particular human user and readily remembered by the particular human user, wherein the second vector contains a second number of presentation elements;

selecting a second particular presentation element from the second vector based on a second secure number; and presenting to the particular human user the second particular presentation element.

18. The computer-readable medium as recited in claim 16, said step of determining the first vector further comprising:

receiving data that defines a plurality of different vectors that include the first vector; and receiving data that indicates a selection of the first vector without making the selection known over the network.

19. The computer-readable medium as recited in claim 18, said step of receiving the data that indicates the selection of the first vector further comprising receiving the data manually input by the particular human user.

20. The computer-readable medium as recited in claim 18, said step of receiving the data that indicates the selection of the first vector further comprising receiving the data stored on a device controlled only by the particular human user.

21. The computer-readable medium as recited in claim 16, wherein the execution of the one or more sequences of instructions further causes the one or more processors to perform the steps of:

determining whether the network identification data is included on a trustworthy list of one or more network identification data values; and if it is determined that the network identification data is not included on the trustworthy list, then presenting to the particular human user warning data that indicates that the message data is from a remote entity that is not trusted.

22. An apparatus for presenting, to a human user, identification for a remote entity on a computer network, comprising:

means for determining a first vector that contains a sequence of a first plurality of presentation elements that are readily distinguishable by a particular human user and readily remembered by the particular human user, wherein the first vector contains a first number of presentation elements;

means for receiving, from a remote process on the computer network, message data that includes network identification data that uniquely identifies a remote entity associated with the remote process;

means for inputting the network identification data to a first secure function to produce a first secure number, wherein a secure function produces dissimilar output values for similar input values;

means for selecting a first particular presentation element from the first vector based only on the first secure number; and means for presenting to the particular human user the first particular presentation element, whereby when a portion of the network identification data is similar to a portion of a trusted network identification data for a trusted remote entity, the first particular presentation element is expected to be dissimilar compared to a trusted presentation element selected from the first vector based on a trusted secure number generated by inputting the trusted network identification data into the first secure function.

23. An apparatus for presenting, to a human user, identification for a remote entity on a computer network, comprising:

a network interface that is coupled to a network for communicating therewith a data packet;

a human interface presentation device;

one or more processors;

a computer-readable medium; and one or more sequences of instructions stored in the computer-readable medium, which, when executed by the one or more processors, causes the one or more processors to carry out the steps of:

determining a first vector that contains a sequence of a first plurality of presentation elements that are readily distinguishable by a particular human user and readily remembered by the particular human user, wherein the first vector contains a first number of presentation elements;

receiving on the network interface from a remote process on the computer network, message data that includes network identification data that uniquely identifies a remote entity associated with the remote process;

after determining the first vector, inputting the network identification data to a first secure function to produce a first secure number, wherein a secure function produces dissimilar output values for similar input values;

selecting a first particular presentation element from the first vector based only on the first secure number; and presenting on the human interface presentation device the first particular presentation element, whereby when a portion of the network identification data is similar to a portion of a trusted network identification data for a trusted remote entity, the first particular presentation is expected to be dissimilar compared to a trusted presentation element selected from the first vector based on a trusted secure number generated by inputting the trusted network identification data into the first secure function.

24. The apparatus as recited in claim 23, wherein the execution of the one or more sequences of instructions further causes the one or more processors to carry out the steps of:
  determining a second vector that contains a sequence of a second plurality of presentation elements that are readily distinguishable by the particular human user and readily remembered by the particular human user, wherein the second vector contains a second number of presentation elements;
  selecting a second particular presentation element from the second vector based on a second secure number; and
  presenting to the particular human user the second particular presentation element.

25. The apparatus as recited in claim 24, wherein the second secure number is the same as the first secure number.

26. The apparatus as recited in claim 24, wherein the execution of the one or more sequences of instructions further causes the one or more processors to carry out the step of, after determining the second vector, inputting the network identification data and fixed data associated with the network identification data to the first secure function to produce the second secure number that is different than the first secure number.

27. The apparatus as recited in claim 24, wherein the execution of the one or more sequences of instructions further causes the one or more processors to carry out the step of, after determining the second vector, inputting the network identification data to a second secure function to produce the second secure number that is different than the first secure number.

28. The apparatus as recited in claim 24, wherein the second vector is the same as the first vector.

29. The apparatus as recited in claim 24, said step of determining the second vector further comprising determining that the second vector is different than the first vector by performing at least one of the following steps:
  forming the sequence of the second plurality of presentation elements by establishing a different sequence of the first plurality of presentation elements;
  selecting the second number of presentation elements from the first plurality of presentation elements, wherein the second number is different than the first number; and
  including in the second plurality of presentation elements a presentation element that is not in the first plurality of presentation elements.

30. The apparatus as recited in claim 24, wherein the execution of the one or more sequences of instructions further causes the one or more processors to carry out the steps of:
  determining a third vector that contains a sequence of a third plurality of presentation elements that are readily distinguishable by the particular human user and readily remembered by the particular human user, wherein the third vector contains a third number of presentation elements;
  selecting a third particular presentation element from the third vector based on a third secure number; and
  presenting to the particular human user the third particular presentation element.

31. The apparatus as recited in claim 23, said step of generating the first secure number further comprising inputting the network identification data into a hash function.

32. The apparatus as recited in claim 23, said step of generating the first secure number further comprising inputting the network identification data and fixed data associated with the network identification data into a hash function.

33. The apparatus as recited in claim 23, said step of determining the first vector further comprising:
  receiving data that defines a plurality of different vectors that include the first vector; and
  receiving data that indicates a selection of the first vector without making the selection known over the network.

34. The apparatus as recited in claim 33, said step of receiving the data that indicates the selection of the first vector further comprising receiving data manually input by the particular human user.

35. The apparatus as recited in claim 33, said step of receiving the data that indicates the selection of the first vector further comprising receiving data stored on a device controlled only by the particular human.

36. The apparatus as recited in claim 23, wherein the execution of the one or more sequences of instructions further causes the one or more processors to carry out the steps of:
  determining whether the network identification data is included on a trustworthy list of one or more network identification data values; and
  if it is determined that the network identification data is not included on the trustworthy list, then presenting to the particular human user warning data that indicates that the message data is from a remote entity that is not trusted.

37. The apparatus as recited in claim 33, said step of receiving the data that indicates the selection of the first vector further comprising receiving data securely from a trusted server on the network.

* * * * *